United States Patent [19]

Sygnator

[11] 4,145,862
[45] Mar. 27, 1979

[54] ROTARY SHEET METAL FASTENER AND FASTENING SYSTEM

[75] Inventor: Henry A. Sygnator, Arlington Heights, Ill.

[73] Assignee: Illinois Tool Works Inc., Chicago, Ill.

[21] Appl. No.: 882,475

[22] Filed: Mar. 1, 1978

[51] Int. Cl.² .............................................. A44B 21/00
[52] U.S. Cl. ................................. 52/811; 24/73 RM; 24/221 R; 52/582
[58] Field of Search ............ 24/221 R, 221 A, 221 K, 24/221 L, 109, 73 RM, 73 SM, 73 P, 213 B; 52/622, 811, 582

[56] References Cited

U.S. PATENT DOCUMENTS

| 2,139,567 | 12/1938 | van Uum | 24/213 B |
| 2,301,477 | 11/1942 | Taylor | 24/221 A |
| 2,352,045 | 6/1944 | von Opel | 24/221 A |
| 3,059,299 | 10/1962 | Sarafinas | 24/213 B |

FOREIGN PATENT DOCUMENTS 480240  2/1938  United Kingdom ................. 24/221 L

*Primary Examiner*—Kenneth J. Dorner
*Attorney, Agent, or Firm*—Thomas W. Buckman; Robert W. Beart

[57] ABSTRACT

A one-piece sheet metal fastening device for securing two work panels together. The device incorporates a split shank joined at its lower extremity, a split head and a laterally extending locking region at the lower extremity of the shank. The shank includes means to preassemble and rotationally align the fastener within an aperture in a first panel so that a second panel can thereafter be associated with the lower locking region of the fastener.

21 Claims, 14 Drawing Figures

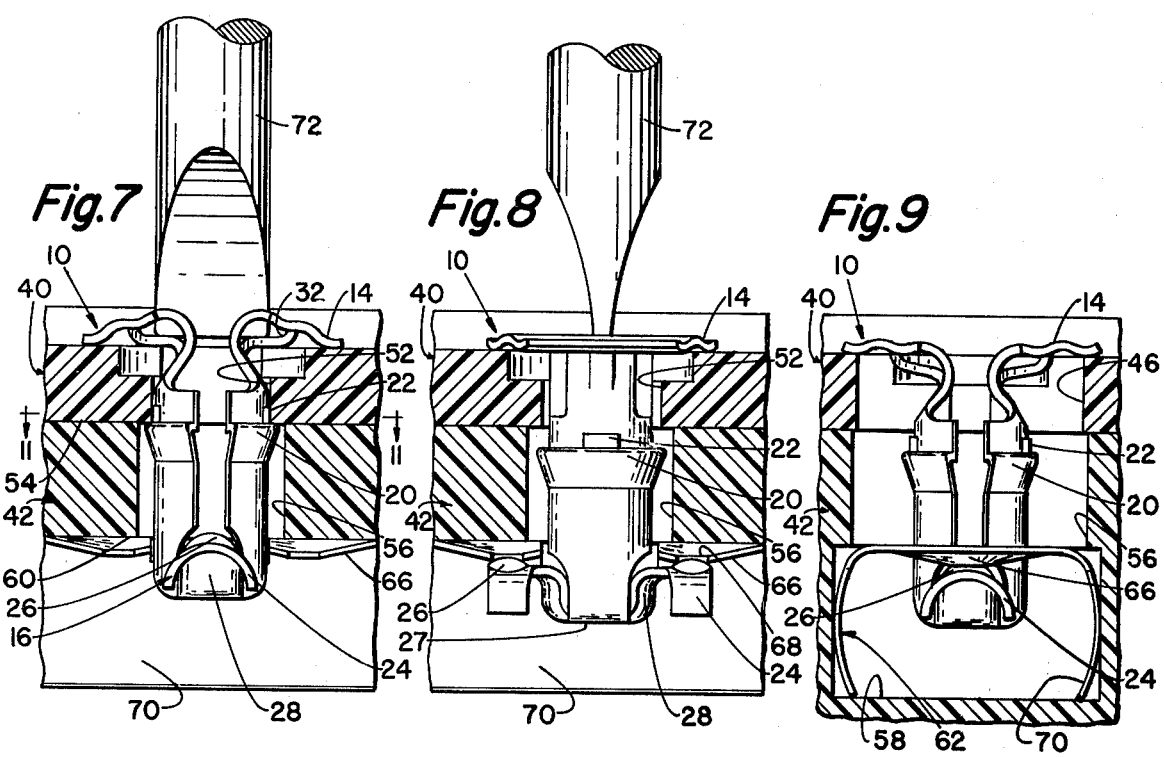
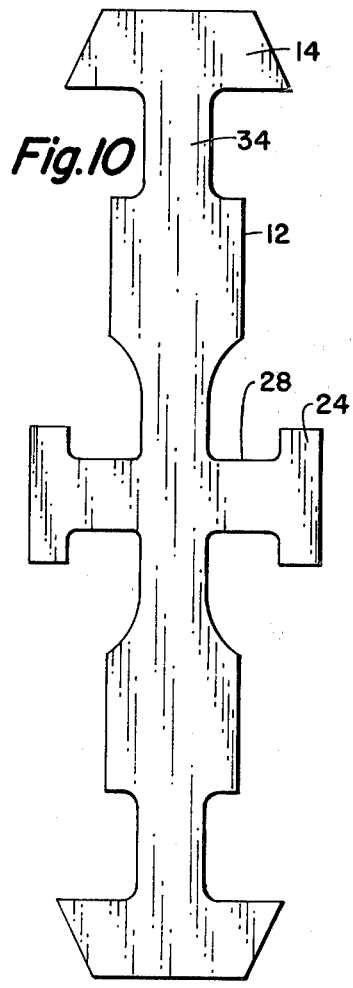
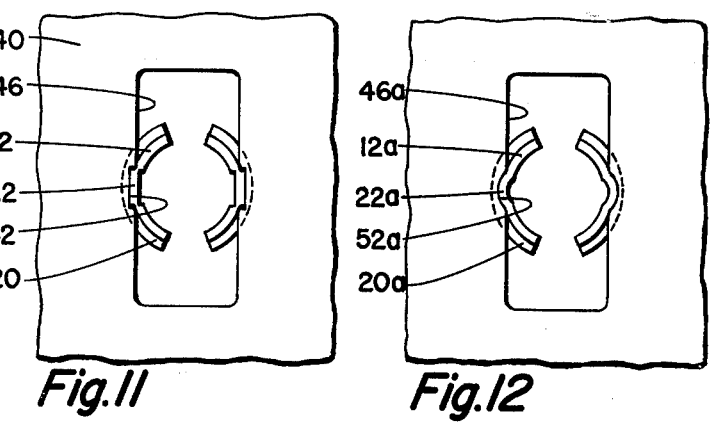
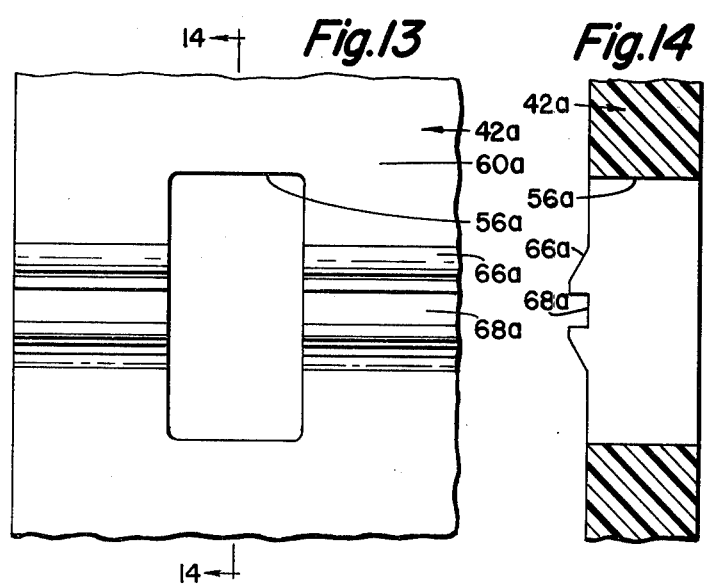

ROTARY SHEET METAL FASTENER AND FASTENING SYSTEM

BACKGROUND OF THE INVENTION

This invention relates generally to rotary, turn-to-set fastener devices and more particularly is directed to quarter turn fasteners operative to quickly secure and release two juxtaposed panels.

Fasteners of this type are well known in the fastening art and are typically configured to include a solid shank with a radially enlarged, generally circular, head with the lower region of the shank having a helical camming groove adapted to receive a wire element integrally formed in a retainer plate affixed below the lowermost panel. In operation, these retainer plates are preferably preassembled to the lowermost panel. The fastener is inserted through a pair of apertures in both panels and rotated a quarter turn so that the grooves lockingly and resiliently engage and compress the wire creating a clamped joint. Devices of this type are typically relatively expensive and obviously require a multipart system and often exhibit relatively high on and off torque to properly seat and/or remove the fastener from its locking position. A retainer plate for such a system must, in some manner, be preassembled to the lower panel.

Other disadvantages of this type of fastener and other prior art turn-to-set fasteners is the inability to preassemble the fastener within a top panel so that a plurality of such fasteners can be preassembled in one panel and all locked after a mating second panel is positioned over the fasteners.

Various plastic devices have been devised exhibiting quarter turn locking features, however none of these incorporate a significant resilient clamping feature.

Accordingly, it is a primary object of the present invention to provide a quarter turn fastener which incorporates features enabling it to be preassembled in a top panel in a particular radial orientation relative to an associated elongated aperture therein so that a plurality of such fasteners can be preassembled, followed by the locking of these fasteners, clamping two plates together after aligned elongated apertures of a second lower panel are assembled over the locking region.

Another object of the invention is to provide a quarter turn fastener which minimizes the material used to produce a firm but slightly flexible clamping joint.

Yet another object of the invention is to provide a fastening system with a particularly designed aperture in at least one of the panels cooperating with alignment and retention means in the fastener for preassembly purposes.

A particular advantage of the invention is a sheet metal fastener incorporating a plurality of spring forces which can be quickly applied to a pair of panels with a minimum of on or off torque.

SUMMARY OF THE INVENTION

In accordance with the invention, a fastener device and system is described which satisfies the objects, aims and advantages above stated. A sheet metal device incorporating a split shank joined at its lower extremity and having laterally projecting head portions on either side of the slot forming the shank halves and including a laterally projecting locking region at the lower extremity extending generally in the plane of the slot. The shank halves are preferably arcuate in cross section and the outer periphery of a region of each shank portion intermediate the head and locking region includes an outwardly extending ledge and an alignment surface formed directly adjacent and above the ledge. The ledge and alignment surface permits the fastener to be inserted into an aperture in a top panel, axially retained and radially positioned therein. The head portions and the locking regions both incorporate spring hinges to facilitate the preassembly and clamping resilience in the final locking position.

The panels to be clamped together will include aligned, elongated apertures with the uppermost panel aperture having alignment grooves adapted to be associated with the alignment surfaces of the fastener when the fastener is inserted therein. The minimum transverse dimension of the elongated aperture in the lower panel will preferably be slightly larger than the minimum transverse dimension of the aperture in the first panel to permit the ledge to snap beneath the lower marginal surface of the first aperture.

The invention could further include camming or locating surfaces formed integral with the lowermost marginal surface of the lower panel or alternatively a cam plate can be associated with the lowermost surface of the lower panel, both of which provide means for securely and lockingly receiving the locking regions of the fastener.

BRIEF DESCRIPTION OF THE DRAWINGS

Other objects and advantages of the invention will become apparent upon reading the following detailed description and upon reference to the drawings in which —

FIG. 7 is an elevational view, in partial section, of the fastener in its preassembled position after a lower panel has been aligned with the fastener.

FIG. 8 is a side elevational view, in partial section, showing the fastener device in its locked position relative to a pair of superimposed panels.

FIG. 9 is a side elevational view, in partial section, of the fastening system shown in FIG. 8 taken 90° to the FIG. 8.

FIG. 10 is a blank outline used to form the fastener of the present invention.

FIG. 11 is a cross sectional view of the fastening system as taken along the lines 11—11 of FIG. 7.

FIG. 12 is a cross-sectional view similar to that of FIG. 11 of an alternate embodiment of the invention.

FIG. 13 is a bottom plan view of an alternate embodiment of a lowermost panel used in the fastening system of the invention.

FIG. 14 is a cross-sectional view of the bottom panel of FIG. 13 as taken along lines 14—14 of FIG. 13.

DETAILED DESCRIPTION OF THE INVENTION

Figure 1:
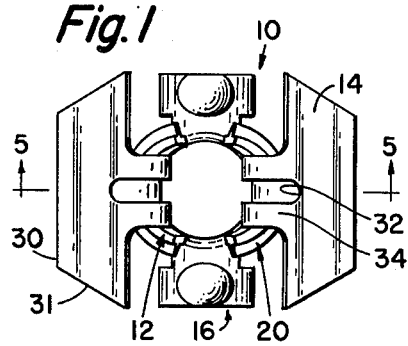
FIG. 1 is a top plan view of the fastener.

Turning now to the drawings where like reference numbers throughout the various views are intended to designate similar elements or components, fastener device 10 will be shown to incorporate various featues of the invention.

Fastener 10 is a one-piece sheet metal device being joined at its entering end and split from the entering end upwardly through the shank and the head. Thus, the shank will comprise a pair of shank halves 12 of a generally arcuate cross-sectional configuration and a pair of opposed head regions 14 located on either side of a slot 18. A laterally extending locking region 16 will be formed at the lowermost extremity of the shank.

Figure 2:
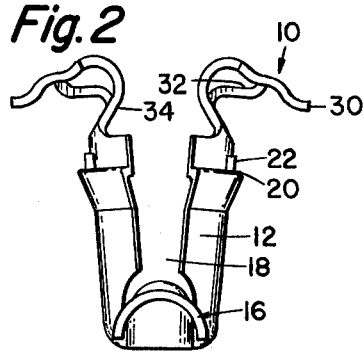
FIG. 2 is a side elevational view of the fastener.
Figure 3:
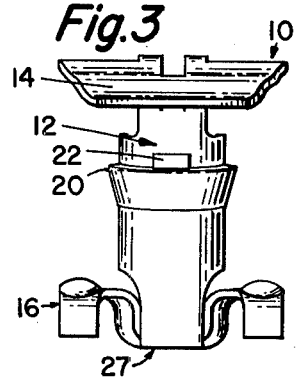
FIG. 3 is a side elevational view of the fastener taken 90° relative to FIG. 2.
Figure 5:
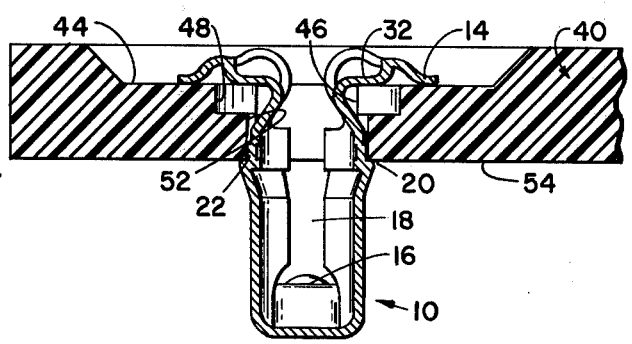
FIG. 5 is a sectional view as would be taken in the direction of lines 5—5 of FIG. 1 with the fastener shown in preassembled condition in a top panel.
Figure 6:
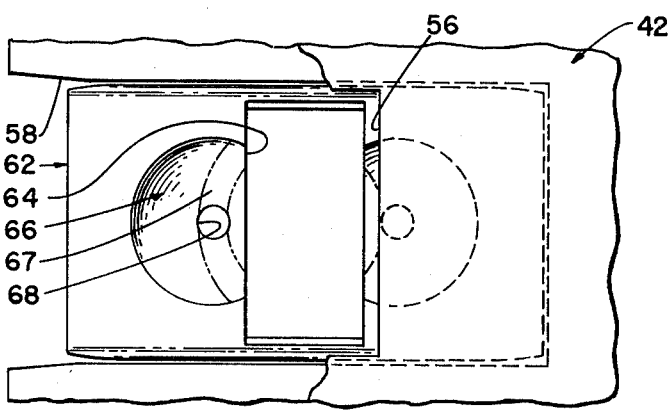
FIG. 6 is a top plan view, in partial section, of the top surface of a lowermost panel showing a cam plate associated with the panel.

Referring to FIGS. 1-3 in conjunction with FIG. 5, certain features of the invention will become apparent. The head halves 14 extend laterally outwardly on either side of an axial plane which in part defines the slot region 18. The shank halves 12 are preferably biased radially outwardly from one another to enhance the preassembly features of the invention to be described later herein. Head regions 14 are generally sloped outwardly and downwardly providing a compression spring member and are connected to the shank by web member 34, essentially providing a hinge about which the spring head may compress. The head regions may be corrugated in directions generally parallel to the slot to enhance the strength and spring features of the head.

The locking region 16 basically includes a pair of laterally extending arms lying generally within the axial plane which in part defines the slot 18. The locking region 16 thus creates a maximum and minimum transverse dimension at the lower extremity. The maximum dimension extends in the direction of the arms and the minimum dimension being generally the transverse dimension of the shank adjacent the lower extremity.

A principle feature of the invention, as will be seen with reference to FIGS. 2, 3, and 5, is the partial annular ledge 20 formed in each of the shank halves and its associated generally flat alignment surface 22 positioned immediately above the ledge. Alignment surface 22, as shown in the preferred embodiment, is a generally flat, limited surface area outward deformation on the shank and is located generally midway in the periphery of each shank half 12 so that the opposing surfaces 22 lie in planes generally parallel to the plane of the slot 18. Since the device 10 is of a sheet metal material, preferably of a uniform thickness, the ledge 20 and alignment surface 22 may be conveniently embossed outwardly from the outer peripheral surface of the arcuate shank half 12. The function and importance of the alignment surfaces 22 and ledge 20 will become apparent upon a closer examination of FIGS. 4 and 5.

An upper panel 40, to be clamped through the use of the fastener of this invention, includes an elongated aperture 46 defining a maximum and minimum transverse dimension. A pair of shallow, longitudinally extending, recesses 50 are formed generally midway in the side of the aperture which defines its maximum dimension.

In operation, the fastener is associated with the aperture 46 in such a manner as to permit the laterally enlarged locking region 16 to be inserted downwardly through the aperture bringing the flat alignment surfaces 22 into mating, cooperative engagement with the recesses 50 so that the flat surface 52 of the recess resiliently abuts flat surface 22. This mating abutment will occur after the shank has been inserted to the extent that annular ledge regions 20 are snapped beneath the lower marginal surface regions of the lower surface 54 of the panel. Thus, the fastener is not only axially retained in the top panel by ledge 20 but is also retained from rotation relative to the top panel through the interaction of the surface 22 and recess 50. It should be noted that the uncompressed axial distance between the outermost edge 30 of the head and the ledge 20 should be slightly less than the panel thickness in the region of the aperture.

Figure 4:
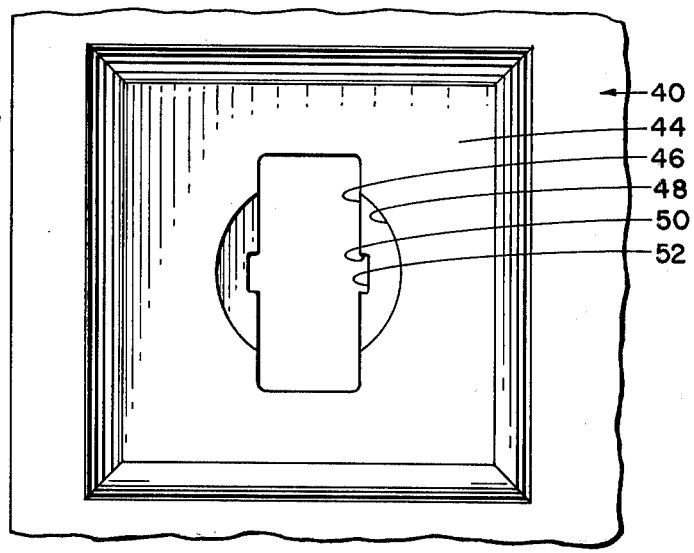
FIG. 4 is a partial top plan view of the aperture in a top panel to be secured using the fastener of this invention.

FIGS. 4 and 5 show that the upper surface of the upper panel 40 may include a first recessed surface 44 in the immediate marginal surface area around the aperture and a second smaller radial extent recess 48 impressed somewhat deeper into the panel. The first, larger surface extent recess 44 permits the head of the fastener to be substantially flush with the otherwise planar surface of the panel, while the smaller and somewhat deeper recess 48 permits the driver blade accepting indentations 32 of the head to be compressed and received therein.

A reference to FIG. 11 will show the interlocking which occurs between the alignment surfaces 52 in the aperture and the alignment surfaces 22 on the shank prohibiting relative rotation of the shank once it has been preassembled with annular ledge 20 abutting against the lower surface 54 of the panel 40.

The present invention is also concerned with a total fastening system incorporating a one-piece fastener device with particularly configured apertures in an upper and lower panel to be clampingly joined together. Accordingly, a lower panel 42 is particularly adapted to be clamped beneath the upper panel using the fastener of this invention.

With reference to FIGS. 7-9, it will be shown that the minimum transverse dimension of the elongated aperture 56 in the lower panel is slightly greater than the aligned minimum transverse dimension of the aperture 46 in the upper panel. As shown in FIG. 7, this dimensional differential enables the ledge 20 of the fastener to abut against the marginal surface beneath the upper panel, thus permitting the preassembly which is an important feature of the invention. The maximum transverse dimension of the aperture 56 may be substantially identical to the maximum transverse dimension of the aperture 46, both of which are sufficient to permit the entry of the locking region 16 of the fastener.

In operation, the fastener 10 or a plurality of fasteners 10 are preassembled and snappingly retained in aligned positions in their respective apertures in the top panel 40. Subsequent to this preassembly, the lower panel 42 is associated beneath the upper panel so that the apertures 46 register with the fastening device 10 as shown generally in FIG. 7. A rotary motion is imparted to the fastener, as for example by a screw driver type tool 72 and the fastener is rotated 90° to the locking position shown in FIGS. 8 and 9. To achieve the locking position, the generally arcuate or bow-shaped elements 24 on each laterally extending locking region preferably ride up a camming surface associated with the lower surface of the panel 42 in a manner to be described later herein. Bow-shaped elements 24 are preferably hingedly connected to the bight region 27 of the shank by a web 28 which extends generally upwardly a short distance forming a cantilever spring element. The uppermost surface area of the bow elements will include a locking protuberance 26. The spring force in the locking region in cooperation with the spring force in the head region 14 contributes to the effective operation of the fastener device. While FIGS. 8 and 9 show the head completely compressed, it should be apparent that this is merely illustrative of the fact that a spring exists in the system at the head region.

With reference to FIGS. 6-9, the preferred embodiment of the system will include a cam plate element 62 preassembled in a cavity 58 formed integral beneath the lower panel 42. The cam plates will include an elongated aperture 64 sufficient to permit the entry of the locking region along its maximum dimension, but configured so that its minimum dimension will be less than the maximum dimension of the locking region of the fastener. On either side of the aperture, downwardly dimpled camming surfaces 66 are provided with an aperture or depression 68 formed herein. These camming surfaces, in cooperation with the bow elements 24, and particularly with locking protuberance 26, create the spring force and locking features sufficient to retain the device in a locking configuration. In certain instances it may be desirable to form a secondary impression in the camming surface, such as a locating path 67, shown in dotted line in order to accurately guide the protuberance 26 along a predefined cam path. The retainer plate is retained in position by downwardly extending spring arms 70 which bear against the sides of the cavity 58.

The camming and locking features provided by cam plates 62 can be alternatively integrally formed on the surface of the lower panel. For example, as shown in FIGS. 13 and 14, camming ridges 66a may be formed to extend upwardly toward a central locking trough 68a. These surface configurations are integrally molded in the formation of the lower surface 60a of a lower panel 42a. This type of configuration and other configurations can be clearly utilized to create the locking and camming features of a discrete cam plate without departing from the true spirit and scope of the invention.

As noted above, the alignment surfaces 22 in cooperation with an alignment surfaces formed in a recess form an important part of the invention. It should become apparent that such a feature may take various forms and still satisfy the aims of the invention. For example, in FIG. 12 an alignment surface 22a is shown to be a dimpled region immediately above a locking ledge 20a with the dimpled region being of a significantly less radius of curvature than the radius of curvature of the shank half 12a. Accordingly, a longitudinal recess 52a, conforming to the radius of curvature of dimpled regions 22a, may be formed in the aperture.

As noted above, one of the advantages of the present invention is the configuration of a quarter turn fastener of sheet metal material utilizing a minimum amount of such material. Device 10 can readily be formed from a blank, such as shown in FIG. 10. Such a blank will include a head half region 14 interconnected to a shank region 12 through a spring web 34. The locking region is formed by a region which is configured to form the bow-shaped element 24 connected by a spring web 28 to the bight region 27 of the fastener.

The fastener system just described can be manipulated in several ways. For example, the on or off torque may be applied through a blade-like driver 72 in the associated recesses 32 formed in the head. However, a hex-type driving socket may also be applied to the parallel outer edges 30 and hex sides 31 on each head half 14. Additionally, the fastener can be locked from beneath the panels through the association of a torque applying tool or particularly designed socket receiving the locking region 16.

The invention thus described clearly provides a quarter turn fastener and fastening system which permits a plurality of fasteners to be preassembled, retained axially and located radially in an aperture so that the second of two panels can be subsequently associated with the fastener and the fasteners all rotated 90° to a firm but somewhat flexible locking position.

It is apparent that there has been provided, therefore, in accordance with the invention a fastener device and fastening system that fully satisfies the objects, aims and advantages set forth above. While the invention has been described in conjunction with specific embodiments thereof, it is evident that many alternatives, modifications and variations will be apparent to those skilled in the art in light of the foregoing description. Accordingly, it is intended to embrace all such alternatives, modifications and variations as fall within the spirit and broad scope of the appended claims.

I claim:

1. A one-piece sheet metal resilient fastener device including a shank, a head region and locking region at opposing extremities of the shank, a slot formed axially of the fastener extending from the locking region through the head region forming pairs of opposing, laterally spaced shank and head sections on either side of an axial plane, the slot creating means to resiliently radially compress the shank sections toward each other, the locking region including a pair of opposing arms extending laterally from the shank and oriented relative to the shank so as to generally lie in said axial plane, ledge means formed on the shank located intermediate the head and locking region, alignment surfaces formed on the shank intermediate the ledge and head wherein the fastener is adapted to be inserted through an aperture in a first plate member, axially retained by the ledge means and aligned in a predetermined radial position relative to the aperture by the alignment surfaces so that a second, lower plate having an aperture may be associated with the lower shank region permitting subsequent rotation of the fastener about its longitudinal axis to move the arms of the fastener into locking engagement with the under surface of the lower plate and the head of the fastener into clamping engagement with the upper surface of the first plate.

2. The fastener device of claim 1, wherein the alignment surfaces are substantially planar.

3. The fastener device of claim 1, wherein the shank is comprised of a pair of substantially identical halves folded into edge to edge opposing relationship and interconnected at their lowermost extremities by a bight region with the locking arms extending radially outwardly from the bight region.

4. The fastener device of claim 3, wherein the shank halves are arcuate in transverse cross-section with the longitudinal side edges of one half opposing and laterally spaced from corresponding longitudinal side edges of the other half thereby defining the axially extending slot.

5. The fastener device of claim 1, wherein the locking region has a first transverse dimension in a direction perpendicular to the axial plane which is substantially equal to the transverse dimension of the shank taken in the same direction and a second transverse dimension taken generally within said axial plane which is greater than said first transverse dimension.

6. The fastener device of claim 3, wherein the ledge means extends in a plane substantially perpendicular to the longitudinal axis of the fastener and is generally arcuate following the contour of the outer peripheral surface of the shank halves.

7. The fastener device of claim 2, wherein the planar alignment surfaces are directly adjacent the ledge means, said planar surfaces being parallel to each other and to said axial plane.

8. The fastener device of claim 1, wherein each arm in the locking region comprises a spring hinge means connection to the shank adapted to permit resilient downward movement of a camming and clamping element formed on each arm and extending laterally outwardly relative to the shank.

9. The fastener device of claim 8, wherein the camming and clamping element is bow-shaped in side elevation when viewed toward the slot opening with the convex surface of the bow directed upwardly toward the head, the spring means comprising a web commencing at the lower extremity of the shank and extending upwardly a short distance with the bow shaped clamping element extending in a cantilever configuration from the uppermost extremity of said web.

10. The fastener device of claim 1, wherein each of the head sections extend outwardly and downwardly from their juncture with the uppermost region of the associated shank section thereby forming axially compressible spring means.

11. The fastener device of claim 1, wherein short, radially extending slots are formed in each head section in a plane transverse said axial plane creating internal torque accepting surfaces.

12. The fastener device of claim 1, wherein the outer periphery of each head section includes a straight edge oriented to be generally parallel to said axial plane.

13. The fastener device of claim 1, in combination with a pair of superimposed, apertured work panel sections to be secured together, an elongated aperture in a first, upper panel with a first transverse dimension defined by cooperating alignment surfaces on either side of said aperture, said first transverse dimension being not substantially greater than the lateral spacing between the alignment surfaces on the fastener so that the alignment surfaces of the fastener may be resiliently biased against the cooperating alignment surfaces in said aperture.

14. The combination of claim 13, where the alignment surfaces on the fastener are protuberances of predetermined, limited surface area and configuration, the cooperating alignment surface in the aperture of the first panel comprising longitudinally extending recesses of cross-sectional configuration complimentary to said protuberances.

15. The fastener device of claim 7, in combination with a pair of superimposed apertured work panel sections to be secured together, the planar alignment surfaces being substantially parallel to each other and to said axial plane and thereby spaced laterally from each other, an elongated aperture in a first, upper panel with a first transverse dimension defined by a pair of opposing parallel planar side wall regions of said aperture, the first dimension of the aperture being not substantially greater than the lateral spacing between the planar surfaces of the fastener so that the planar surfaces of the fastener may be resiliently biased against the planar side wall surfaces, rotationally aligning and securing the fastener in a predetermined radial disposition relative to the aperture.

16. The combination of claim 13, wherein the ledge means extend radially outwardly of the alignment surfaces and is spaced axially downwardly from the bottommost region of an axially compressible spring head a distance slightly less than the thickness of the upper work panel so that the fastener may be axially retained therein.

17. The combination of claim 13, wherein a second lower panel includes an elongated aperture positioned so that the major and minor dimension of the superimposed elongated apertures are aligned, the locking region of the fastener having a first transverse dimension in a direction perpendicular to said axial plane, which is substantially equal to the transverse dimension of the shank taken in the same direction, and generally equal to the minor dimension of the superimposed apertures, the locking region having a second transverse dimension taken generally in the plane of said axial plane which is greater than said first transverse dimension but slightly less than the major dimension of the superimposed apertures, camming and locking surface means provided at the lower surface of the lower panel in the marginal surfaces regions adjacent the opposing peripheral sections of the elongated aperture which define the minor dimension thereof, said camming and locking surface means cooperating with camming and clamping means on the laterally extending arms of the fastener to retain the arms in clamped resilient engagement with the under surface of the lower panel.

18. The combination of claim 15, wherein the parallel planar side wall regions of the aperture in the first panel are part of longitudinally extending recesses formed in the walls of said aperture.

19. The combination of claim 13, wherein the second lower panel includes an elongated aperture positioned so that the major and minor dimension of the superimposed elongated apertures are aligned, the minor dimension of the aperture in the second, lower panel being slightly greater than the minor dimension of the aperture in the first, upper panel thereby permitting the ledge means to be snapped beneath the first panel into engagement with the lower marginal surface regions adjacent the peripheral sections of the aperture in the first panel which define the minor dimensions thereof, wherein said fastener may be preassembled thereto in proper rotational alignment.

20. The combination of claim 17, wherein the camming and locking surface means are formed in the lower panel surface.

21. A one-piece sheet metal resilient fastener device in combination with a pair of superimposed apertured work panel sections to be secured together, the fastener device including a shank, a head region and locking region at opposing extremities of the shank, a slot formed axially of the fastener extending from the locking region through the head region forming pairs of opposing, laterally spaced shank and head sections on either side of an axial plane, the slot creating means to resiliently radially compress the shank sections toward each other, the locking region including a pair of opposing arms extending laterally from the shank and oriented relative to the shank so as to generally lie in said axial plane, ledge means formed on the shank located intermediate the head and locking region, alignment surfaces formed on the shank intermediate the ledge and head, the panel sections being defined as including an elongated aperture in a first, upper panel with a first transverse dimension defined by cooperating alignment surfaces on either side of said aperture, said first transverse dimension being not substantially greater than the lateral spacing between the alignment surfaces on the fastener so that the alignment surfaces of the fastener may be resiliently biased against the cooperating alignment surfaces in said aperture, the second lower panel includes an elongated aperture positioned so that the major and minor dimension of the superimposed elongated apertures are aligned, the locking region of the fastener having a first transverse dimension in a direction perpendicular to said axial plane, which is substantially equal to the transverse dimension of the shank taken in the same direction, and generally equal to the minor dimension of the superimposed apertures, the locking region having a second transverse dimension taken generally in the plane of said axial plane which is greater than said first transverse dimension but slightly less than the major dimension of the superimposed apertures, camming and locking surface means provided at the lower surface of the lower panel in the marginal surface regions adjacent the opposing peripheral sections of the elongated aperture which define the minor dimension thereof, said camming and locking surface means cooperating with camming and clamping means on the laterally extending arms of the fastener to retain the arms in clamped resilient engagement with the under surface of the lower panel, the camming and locking surface means being formed on a discrete plate element superimposed over the lower surface of the lower panel wherein the fastener is adapted to be inserted through an aperture in a first plate member, axially retained by the ledge means and aligned in a predetermined radial position relative to the aperture by the alignment surfaces so that a second, lower plate having an aperture may be associated with the lower shank region permitting subsequent rotation of the fastener about its longitudinal axis to move the arms of the fastener into locking engagement with the under surface of the discrete plate element and the head of the fastener into clamping engagement with the upper surface of the first plate.

* * * * *